Sept. 16, 1969                M. K. POTTER                3,466,788
                               FISHING SINKER
Filed Feb. 17, 1967                                    2 Sheets-Sheet 1

INVENTOR.
MARDELL K. POTTER
BY
Head & Johnson
ATTORNEYS

Sept. 16, 1969       M. K. POTTER       3,466,788
FISHING SINKER
Filed Feb. 17, 1967       2 Sheets-Sheet 2
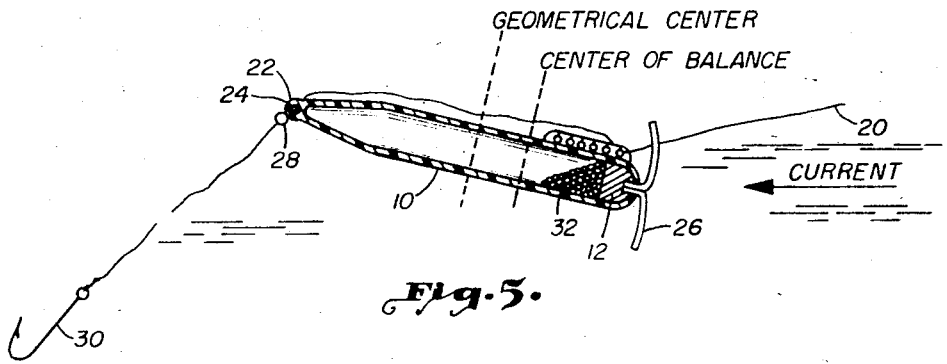
Fig. 5.
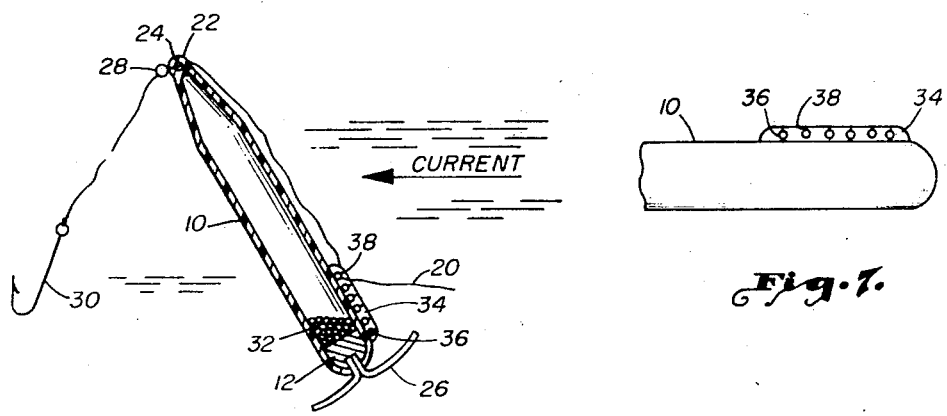
Fig. 6.
Fig. 7.
Fig. 8.
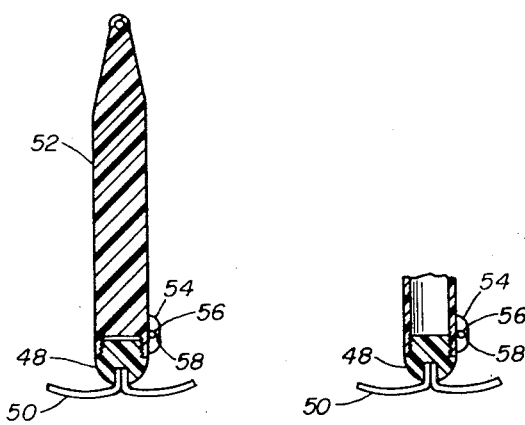
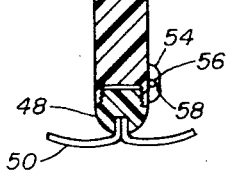
Fig. 10.
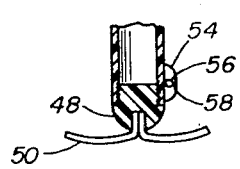
Fig. 9.
INVENTOR.
MARDELL K. POTTER
BY
Head & Johnson
ATTORNEYS United States Patent Office 3,466,788
Patented Sept. 16, 1969

3,466,788
FISHING SINKER
Mardell K. Potter, 325 S. Independence,
Sapulpa, Okla. 74066
Filed Feb. 17, 1967, Ser. No. 616,940
Int. Cl. A01k 95/00, 97/00
U.S. Cl. 43—44.96                                    5 Claims

ABSTRACT OF THE DISCLOSURE

A fishing sinker having a weighted end and a buoyant end. A small housing is provided on the side of the elongated body near the weighted end with a transverse opening through the housing to receive the fishing line. A slot communicates with the opening in the housing so that the line may be inserted through the slot into the opening and removed therefrom. At the end of a buoyant portion is an eyelet through which the line passes after being received within the opening of the housing. Extending substantially transversely radially relative to the longitudinal axis of the body from an embedded position adjacent the weighted end are a plurality of flexible wire members which serve to contact obstructions so as to hold the sinker in moving water. After being cast, the line may be removed from the opening in the housing by a quick jerk.

This invention relates to fishing tackle, and more particularly, this invention relates to fishing sinkers.

Snagging of a fishing line is one of the most serious problems facing the fisherman. Not only does he risk losing his fishing tackle when his line becomes snagged, but he might spend considerable time in attempting to free his line. Snagging can occur in both calm water and in a strong current, and occurs when the fishing tackle encounters rocks, submerged brush, or other debris at the bottom of the body of water. Snagging can occur when the fishing tackle settles to the bottom of the body of water, but the chances of snagging are increased as the tackle is being retrieved from its cast position. As the tackle is being dragged along the bottom of the body of water the chances of encountering obstacles are increased, as well as when the tackle is being dragged through the water at an intermediate depth as by trolling. But the chances of snagging are greatly reduced when the sinker employed is designed so that the retrieval of the fishing tackle can be made near the surface.

The primary object of this invention is to provide a fishing line sinker which will prevent snagging of the fishing tackle upon underwater obstructions.

Another object of this invention is to provide a fishing line sinker simple and inexpensive to manufacture, and which will be efficient to use.

Still another object of this invention is to provide a fishing line sinker which will prevent snagging of the fishing tackle upon submerged obstacles and which is adjustable for operation under varying conditions.

Further objects and advantages of the invention will become apparent from the following description and claims, and from the accompanying drawings, wherein:

FIGURE 5 is a cross-sectional view of a fishing line sinker according to this invention showing a modified form of a sinker having adjustable line attaching means.

FIGURE 6 is a cross-sectional view of a fishing line sinker according to this invention having adjustable line attaching means showing a different mode of attachment than in FIGURE 5.

FIGURE 7 is a partial elevational view of a sinker according to this invention showing adjustable line attaching means.

FIGURE 8 is a partial perspective view of a sinker according to this invention showing a modified form of adjustable line attaching means.

FIGURE 9 is a partial cross-sectional view of a sinker according to this invention showing a modified form of a weighted portion of the sinker.

FIGURE 10 is a cross-sectional view of a modified form of a fishing line sinker according to this invention.

Figure 1:
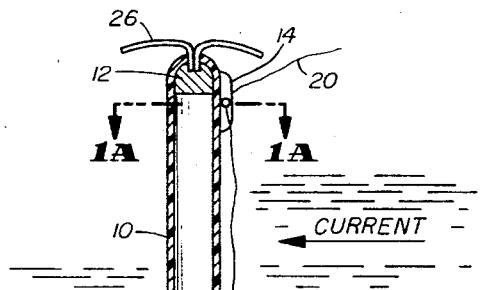
FIGURE 1 is a cross-sectional view of a fishing line sinker according to this invention showing the sinker in proper position for casting.
Figure 1A:
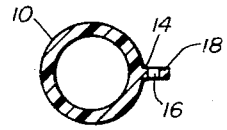
FIGURE 1A is a section view taken along lines 1A—1A of FIG. 1.

A fishing line sinker of this invention comprises an elongated body having a weighted portion at one end and a buoyant portion at the other end. Means are provided on a side of the body close to the end of the weighted portion to removably receive a fishing line. These means include a housing member positioned longitudinally along the body with a transverse opening through the housing member to receive the fishing line. A line-receiving slot communicates with the said opening to provide access of the fishing line to the opening. The opening in the housing member is substantially larger than the fishing line so that the line may move loosely therethrough and the slot is of substantially the same size as the cross-sectional diameter of the fishing line so that the line can be inserted within the said opening only upon proper alignment with the slot. Also, the line can be withdrawn from the opening only when the force applied to the line presents the line in proper alignment with the slot. A line-guiding eye at the end of the buoyant portion loosely receives the line therethrough after the line has been passed through the opening in the housing member; and after a short length of line has passed through the eye, a conventional fishing hook is attached thereto.

Referring now to the drawings in detail, FIGURES 1 through 4 show a fishing line sinker according to the invention in different modes of use. The fishing line sinker comprises an elongated body portion 10 which has secured at one end thereof a weight member 12 which may be formed of a heavy metallic material such as lead. Thus, body 10 comprises a weighted portion adjacent one end and a buoyant portion comprising the larger part of said body. As shown in FIGURES 1, 2, 3, and 4, the body portion 10 is of hollow construction and weight member 12 is embedded within body 10, although other conformations which retain the characteristic of a weighted end portion and an adjacent elongated buoyant portion are equally applicable, and such modifications will be described hereinafter. A cylindrical arrangement of body 10 is preferred, although other geometrical configurations for the cross-sectional portion of body 10 such as square, hexagonal, or octagonal, are equally usable. Positioned on the outside of body 10 near the weighted end of body 10 is a raised portion or housing 14 which includes an opening 16 transverse of housing 14 and having its axis in a plane normal to the plane of the axis of body 10. Communicating with opening 14 is a slot 18 which is positioned in housing 14 to receive a fishing line 20 so that the line may be positioned within opening 16. Opening 16 is somewhat larger than the fishing line 20 being used so that the line may move freely through the opening. But, slot 18 is of approximately the same size as the fishing line 20 currently being used so that once the line is positioned through opening 16 the line may be removed therefrom only upon proper alignment with slot 18 and the exertion of a slight force upon the fishing line. That is, fishing line 20 may be either slightly larger than slot 18 or slightly smaller than slot 18. At the end of the buoyant portion of body 10 is formed an eyelet 22 which has an opening 24 therein also substantially larger than the fishing line being used so that the fishing line can be threaded through opening 24 and will be received loosely therethrough. Protruding from the weighted portion of body 10 are at least two flexible wire members 26 which serve as means to engage temporarily obstructions in moving water so that the sinker can be properly positioned and operated as described more fully hereinafter. A stop means such as a split shot 28 is usually positioned on line 20 so that a desired distance may be maintained between the sinker and a fish hook 30 at the end of line 20.

FIGURES 5 and 6 describe a modified form of fish sinker according to this invention in which body 10 contains an amount of lead shot 32 as desired, as well as an adjustable point of attachment of the line.

In this modified version of the inveniton housing 34 includes a plurality of openings 36 each of which communicates with an adjacent slot 38 so that the fishing line 20 may be pushed through any particular slot 38 as desired to be positioned within the selected opening 36.

In the modification shown in FIGURES 5 and 6, the purpose of providing an adjustable housing 34 in conjunction with particulate lead shot 32 is to permit an adjustment for the forces exerted upon the sinker. For example, provision of particulate lead shot in conjunction with the fixed weight will allow the point of attachment to be made adjustable over a greater distance without changing the angle of suspension of the sinker enough to cause the line to be pulled from the slot during the cast. Incorporation of adjustable points of attachment cannot be as efficiently provided where the sinker includes a single fixed weight because the point of balance is too close to the fixed weight. FIGURE 5 shows a line drawn through the geometrical center or midpoint of the sinker and a line drawn through the imaginary center of balance of the sinker. That is, when an amount of lead shot 32 having a total weight less than the weight of weight member 12 is placed within the hollow body 10 and the particulate lead shot is moved to the end of body 10 adjacent eyelet 22, the sinker will be in a horizontal position when suspended by attachment at a point on this center of balance. The means for adjustment shown in FIGURES 5 and 6 are positioned such that the point of attachment of the sinker to line 20 can be made somewhere between the center of balance and the end of body 10 containing weight member 12. It can also be seen by comparing FIGURES 5 and 6 that in positioning line 20 within an opening 36 close to the center of balance, a strong force exerted upon the fishing sinker by a high velocity current will more easily cause line 20 to be pulled from opening 36 before the user desires to have this done. Therefore, by positioning line 20 in an adjustment opening closer to the end of the sinker containing weight 12 there would be less chance of line 20 being pulled prematurely from opening 36.

FIGURE 7 shows a portion of a fishing sinker incorporating a housing 34 having a plurality of adjustment openings for receiving a fishing line without showing the line in position. Of course, it can also be seen from the comparison of FIGURES 5, 6, 7 with FIGURES 1, 2, 3 and 4, that a housing member as disclosed in FIGURE 7 could also be incorporated into the sinker device of FIGURE 1.

FIGURE 8 describes an alternate form of providing an adjustable line receiving means. An adjustable band 40 is positioned around the body 10 of the sinker and includes a housing member 42 having an opening 44 therein communicating with a slot 46. Band 40 may be positioned slidably along body 10 as desired, and may be held in place by means of the friction between band 40 and body 10. Other conventional means of holding the band in place may be employed, for example, by the cooperation of fine teeth or ridge members arranged on the exterior surface of body 10 normal to the longitudinal axis of body 10 in cooperation with similar teeth members on the interior surface of band 40. Or, band 40 may be split longitudinally and be held in position by a conventional nut and bolt holding the ends thereof in tight engagement. Thus, it can be seen that the adjustment band described in FIGURE 8 will serve the same purpose as housing member 34 described in FIGURES 5, 6 and 7.

FIGURE 9 describes an alternate form of incorporating a weight member into the weighted portion of the body 10. In FIGURE 9 a weight 48 is provided with threads which cooperate with threads formed on the interior surface of hollow body 10. In this manner weight 48 can be easily removed and suitable other weight members may be substituted therefor to provide another means for adjusting the weight of the sinker. Weight 48 has embedded therein flexible wire members 50 similar to members 26 and serving the same purpose.

FIGURE 10 describes a further modification of a sinker in that in FIGURE 10 the body portion 52 is a solid member and is made buoyant by being formed of such materials as a light wood or a light plastic such as Styrofoam. In the embodiment described in FIGURE 10, the weight portion is shown as being provided by a weight 48 threadedly received into body 52. On one side of body 52 may be positioned a line-receiving means such as those previously described, but for purposes of illustration, FIGURE 10 describes a single line-receiving means comprising a housing 54 having therein an opening 56 communicating with a slot 58.

OPERATION

The sinker device described in this invention is intended to provide sufficient weight for a fishing line so that the fisherman may cast his bait a reasonable distance, and so that his bait can be carried to the bottom of the body of water or to an intermediate depth, so that the sinker and other tackle may be lifted almost directly to the surface of the water when being retrieved, thereby eliminating snagging of the tackle upon submerged obstacles.

Figure 3:
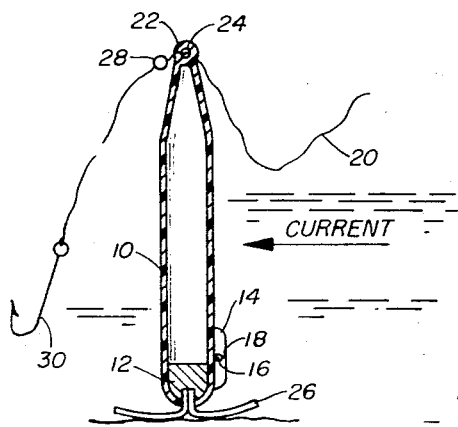
FIGURE 3 is a cross-sectional view of a fishing line sinker according to this invention as it would be preparatory to retrieval.
Figure 4:
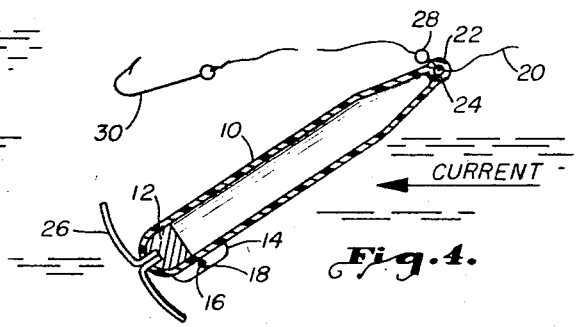
FIGURE 4 is a cross-sectional view of a fishing line sinker according to this invention as it would be during retrieval.

For example, to use the sinker device in calm water, the finishing line may be threaded only through eyelet 22 with a split shot clamped on line 20 to prevent the sinker from moving all the way to the hook. Prior to the cast the sinker will hang with the weighted portion downward and, after striking the water, the sinker will settle on the bottom in the position as shown in FIGURE 3. When the retrieval is begun, the sinker device will assume a position as shown in FIGURE 4 with the buoyant end somewhat raised and the weighted portion in a downward position.

Figure 2:
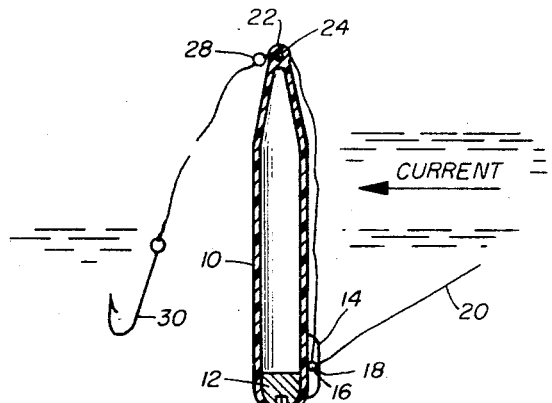
FIGURE 2 is a cross-sectional view of a fishing line sinker according to this invention as it would be in resting position upon the bottom of a body of water.

For downstream casting in moving water the sinker device is attached to the fishing line 20 as above described but with the fishing line now inserted through slot 18 in housing 14 so that the line will be received loosely in opening 16. Thus, upon casting, the device will assume the position described in FIGURE 1. The device will enter the water in a position as shown in FIGURE 2, but the force of the current will cause the sinker device to settle on the bottom in a tilted position with the buoyant end being forced downstream by the current, as seen in FIGURES 5 and 6, and a wire member 26 will engage the bottom to hold the sinker against movement by the water current. When retrieval is begun, the fisherman may give the line a sharp jerk and the line will snap free of opening 16 to be attached to the sinker device only through eyelet 22. Retrieval against the current will then bring about a planing effect upon the sinker device and the force of the current will cause the sinker to assume the position shown in FIGURE 4.

If the device is attached to the fishing line in a manner similar to that of FIGURE 2, and if the device should encounter obstacles temporarily upon retrieval, the fishing line can be easily removed from opening 16. With this done the vector of forces cause the sinker device to assume a position as in FIGURE 4 so that the device will then move away from any obstacle.

The device of this invention can also be used with great effect in conjunction with a trolling line to regulate the depth of the fishing lure at a given speed, particularly where an adjustable modification of the sinker device is employed. With one of the adjustable modifications of the sinker device, the point of attachment of the fishing line can be chosen so that the force exerted upon the device by the speed of the boat and the velocity of the current will not position the device at an angle such that the line could be easily removed from opening 16, 36 or 44. With proper choice of the point of attachment, the line can be pulled from opening 16, 36 or 44 when a slight additional force is applied to the device as might be encountered by contact with a submerged obstacle. Or, the line can be pulled from the lower opening and the point of attachment will be at eyelet 22 so that the sinker device will move up and away from the object without being snagged permanently.

Since many different embodiments of this invention may be made without departing from the spirit and scope thereof, it is to be understood that the specific embodiments described in detail herein are not to be taken as a limiting sense.

I claim:

1. A fishing sinker for use in fishing in streams or other bodies of water where water currents exist comprising:
    an elongated floatable body;
    a line-guiding eye at one end of said body;
    a weight carried internally of said body at the end thereof opposite said line-guiding eye, the weight being sufficient that the body sinks in water;
    a line-receiving means on the exterior of said body adjacent the weighted end; and
    a plurality of flexible wire members each affixed to the weighted end of said body and each extending radially in a substantially transverse plane relative to the longitudinal axis of said body and configured to engage obstacles to hold the sinker against movement by water current while fishing, and whereby upon retrieval force, the obstacle will be disengaged.

2. A fishing sinker according to claim 1 wherein said line-receiving means includes a relatively thin flange portion affixed to and extending radially from the exterior of said body in a plane of the body's longitudinal axis, said flange portion having an opening therein and a slot communicating the opening with the outer edge of the flange portion, the opening being of larger diameter than the line to be received and the slot being slightly less in width than the diameter of the line to be received whereby the line can be removably inserted into and withdrawn from said opening.

3. A fishing sinker according to claim 2 including a plurality of spaced apart openings in said flange portion, and a slot communicating each of said openings with the outer edge of said flange portion, each of said openings being of larger diameter than the line to be received and each of said slots being slightly less in width than the diameter of the line to be received whereby the line can be removably inserted into and withdrawn from said openings.

4. A fishing sinker according to claim 2 wherein said line-receiving means on the exterior of said body adjacent the weighted end includes a ring member slidably received on the exterior of said body, and said relatively thin flange portion affixed to and extending radially from the exterior of said ring in a plane of the body's longitudinal axis, said flange portion having an opening therein and a slot communicating the opening with the outer edge of the flange portion, the opening being of larger diameter than the line to be received and the slot being slightly less in width than the diameter of the line to be received whereby the line can be removably inserted into and withdrawn from said opening.

5. A fishing sinker according to claim 2 wherein said body is hollow, and including:
    a plurality of small shot weights loosely positioned within said body, the combined weight of said weight carried by said body and said shot weights being such as to cause said body to sink in water.

References Cited

UNITED STATES PATENTS

| 12,060 | 12/1854 | Hoard | 43—43.14 |
| 2,482,343 | 9/1949 | Ingleton | 43—44.88 |
| 2,605,576 | 8/1952 | Young et al. | 43—43.14 X |
| 2,770,909 | 11/1956 | Illgner | 43—43.14 |
| 2,937,469 | 5/1960 | Tiede | 43—44.88 |
| 2,980,050 | 4/1961 | Murray | 43—44.96 X |
| 3,214,858 | 11/1965 | Louie | 43—44.88 X |

FOREIGN PATENTS

| 1,036,232 | 4/1953 | France. |
| 605,913 | 8/1948 | Great Britain. |

ALDRICH F. MEDBERY, Primary Examiner

J. H. CZERWONKY, Assistant Examiner

U.S. Cl. X.R.

43—42.23, 44.88, 44.97